US007257227B2

(12) United States Patent
Chen et al.

(10) Patent No.: US 7,257,227 B2
(45) Date of Patent: Aug. 14, 2007

(54) SYSTEM FOR DENYING ACCESS TO CONTENT GENERATED BY A COMPROMISED OFF LINE ENCRYPTION DEVICE AND FOR CONVEYING CRYPTOGRAPHIC KEYS FROM MULTIPLE CONDITIONAL ACCESS SYSTEMS

(75) Inventors: Annie On-yee Chen, Del Mar, CA (US); Lawrence W. Tang, San Diego, CA (US); Akiko Wakabayashi, Encinitas, CA (US)

(73) Assignee: General Instrument Corporation, Horsham, PA (US)

( * ) Notice: Subject to any disclaimer, the term of this patent is extended or adjusted under 35 U.S.C. 154(b) by 792 days.

(21) Appl. No.: 09/898,136

(22) Filed: Jul. 3, 2001

(65) Prior Publication Data

US 2002/0076050 A1    Jun. 20, 2002

(51) Int. Cl.
*H04L 9/00* (2006.01)
(52) U.S. Cl. ............... 380/211; 380/210; 380/239; 380/240; 725/31
(58) Field of Classification Search ........ 380/210–211, 380/231–232, 239–240; 725/29, 31, 87, 725/114
See application file for complete search history.

(56) References Cited

U.S. PATENT DOCUMENTS

| 6,157,719 A * | 12/2000 | Wasilewski et al. ........ 380/210 |
| 6,307,939 B1 * | 10/2001 | Vigarie ....................... 380/210 |
| 6,363,149 B1 * | 3/2002 | Candelore ..................... 380/45 |
| 7,023,992 B1 * | 4/2006 | Kubota et al. .............. 380/210 |
| 2002/0007494 A1 * | 1/2002 | Hodge ........................ 725/109 |

FOREIGN PATENT DOCUMENTS

| WO | WO 98/43426 | * 10/1998 |
| WO | WO 00/67483 | * 11/2000 |

OTHER PUBLICATIONS

Functional Model of a Conditional Access System, EBU Project Group B/CA, EBU Technical Review No. 226, Dec. 1995, Retrieved from the Internet on May 19, 2005: <URL: http://www.ebu.ch/trev_266-contents.html>.*

* cited by examiner

*Primary Examiner*—Gilberto Barron, Jr.
*Assistant Examiner*—Minh Dinh
(74) *Attorney, Agent, or Firm*—Thomas Bethea, Jr.

(57) ABSTRACT

A method for forwarding messages containing cryptographic keys from a conditional access system that controls a population of set-top boxes to an encryption renewal system. The method includes storing a fictitious address of a virtual set-top box; generating a message based on the fictitious address, the message containing a cryptographic key; and forwarding the message to the fictitious address of the virtual set-top box. The encryption renewal system has information regarding the virtual set-top box, and is the recipient of the message. In addition, the encryption renewal system is for controlling access to pre-encrypted content generated by an encryption device. The system includes software instructions for receiving a request to retrofit an entitlement control message that allows a home device to access pre-encrypted content; and software instructions for retrofitting the entitlement control message only after verifying that the pre-encrypted content was generated prior to or contemporaneous with an authorized timestamp.

4 Claims, 4 Drawing Sheets

SYSTEM FOR DENYING ACCESS TO CONTENT GENERATED BY A COMPROMISED OFF LINE ENCRYPTION DEVICE AND FOR CONVEYING CRYPTOGRAPHIC KEYS FROM MULTIPLE CONDITIONAL ACCESS SYSTEMS

This application is rerated to U.S. patent application Ser. No. 08/420,710, now U.S. Pat. No. 5,627,892, entitled "DATA SECURITY SCHEME FOR POINT-TO-POINT COMMUNICATION SESSIONS," filed Apr. 19, 1995, U.S. patent application Ser. No. 09/898,184, entitled "SYSTEM FOR SECURELY DELIVERING PRE-ENCRYPTED CONTENT ON DEMAND WITH ACCESS-CONTROL," filed Jul. 3, 2001; U.S. application Ser. No. 09/898,168, entitled "SYSTEM FOR SECURING ENCRYPTION RENEWAL DEVICE AND FOR REGISTRATION AND REMOTE ACTIVATION OF ENCRYPTION DEVICE," filed Jul. 3, 2001.

BACKGROUND OF THE INVENTION

The present invention relates generally to the field of content communication and more specifically to a system for communicating video content on demand through a communication network.

Conventional systems for delivering video content on demand to subscribers are becoming well known. VOD (video on demand) is an interactive service in which content (e.g., video) is delivered to a subscriber over a point-to-point network (e.g., a cable system) on an on demand basis. A subscriber may order and receive programming content at any time, without adhering to a predefined showing schedule. The subscriber is often provided VCR-like motion control functions, such as pause (freeze frame), slow motion, scan forward, and slow backward. The subscriber is typically allowed multiple viewings of a purchased program within a time window, e.g., 24 hours. VOD mimics (or exceeds) the level of control and convenience of rental video tapes. For a VOD service to prevent unauthorized access, the system implementing it provides some form of conditional access.

Conditional Access

The system implementing VOD provides the capability to limit content access to authorized subscribers only, as the contents delivered as part of the service are generally considered valuable intellectual properties by their owners. In cable and satellite television, such capability is known as conditional access. Conditional access requires a trustworthy mechanism for classifying subscribers into different classes, and an enforcement mechanism for denying access to unauthorized subscribers. Encryption is typically the mechanism used to deny unauthorized access to content (as opposed to carrier signal).

Entitlement Management Messages

EMMs (Entitlement Management Messages) are control messages that convey access privileges to subscriber terminals. Unlike ECMs (Entitlement Control Messages) (discussed below) which are embedded in transport multiplexes and are broadcast to multiple subscribers, EMMs are sent unicast-addressed to each subscriber terminal. That is, an EMM is specific to a particular subscriber. In a typical implementation, an EMM contains information about the monthly key, as well as information that allows a subscriber terminal to access an ECM which is sent later. EMMs also define the tiers for each subscriber. With reference to cable services, for example, a first EMM may allow access to HBO™, ESPN™ and CNN™. A second EMM may allow access to ESPN™, TNN™ and BET™, etc.

Entitlement Control Messages

In a conditional access system, each content stream is associated with a stream of ECMs that serve two basic functions: (1) to specify the access requirements for the associated content stream (i.e., what privileges are required for access for particular programs); and (2) to convey the information needed by subscriber terminals to compute the cryptographic key(s), which are needed for content decryption. ECMs are transmitted in-band alongside their associated content streams. Typically, ECMs are cryptographically protected by a "monthly key" which changes periodically, usually on a monthly basis. The monthly key is typically distributed by EMMs prior to the ECMs, as noted above.

Encryption

In a cable system, carrier signals are broadcast to a population of subscriber terminals (also known as set-top boxes). To prevent unauthorized access to service, encryption is often employed. When content is encrypted, it becomes unintelligible to persons or devices that don't possess the proper cryptographic key(s).

Disadvantageously, for VOD, real-time encryption poses much greater cost and space issues. A medium-sized cable system may have, for example, 50,000 subscribers. Using a common estimate of 10% peak simultaneous usage, there can be up to 5000 simultaneous VOD sessions during the peak hours. A typical encryption device can process a small number of transport multiplexes (digital carriers). Over 300 such real-time encryption devices will be needed to handle the peak usage in the example system. Such a large amount of equipment not only adds significantly to the system cost, but also poses a space requirement challenge.

One solution to the aforementioned problem is disclosed in copending related application entitled, "SYSTEM FOR SECURELY DELIVERING PRE-ENCRYPTED CONTENT ON DEMAND WITH ACCESS CONTROL," Ser. No. 09/898,184, filed Jul. 3, 2001, which is hereby incorporated by reference in its entirety. In U.S. Ser. No. 09/898, 184, a system is disclosed that encrypts content offline (typically before the content is requested by the user) before it is distributed to point-to-point systems such as cable systems. The system allows content to be encrypted once, at a centralized facility, and to be useable at different point-to-point systems. Advantageously, the pre-encrypted contents in the present invention have indefinite lifetimes. The system periodically performs an operation called ECM retrofitting, enabling the content to be useable in multiple systems and useable multiple times in the same system. The amount of data being processed during ECM retrofitting is very small (on the order of several thousand bytes). There is no need to reprocess the pre-encrypted contents. This is a significant advantage, as several thousand bytes represent only a tiny fraction of the size of a typical 2-hour video program, which is about 3 gigabytes (3,000,000,000 bytes) in size.

In a first embodiment, the system of U.S. Ser. No. 09/898,184, includes a content preparation system (CPS) for pre-encrypting the content offline to form pre-encrypted content; an encryption renewal system (ERS) for generating entitlement control messages (EGMs) that allow the pre-encrypted content to be decryptable for a designated duration; and a conditional access system (GAS). Conventionally, the GAS controls a population of set-top boxes using a randomly generated periodical key. Only with possession of the periodical key can the pre-encrypted content be decrypted by the set-top boxes. The periodical key is initially forwarded to the ERS which thereafter generates an EGM containing information regarding the periodical key.

Next, the ECM and the periodical key information are retrofitted to the pre-encrypted content and are forwarded with the pre-encrypted content to the subscriber terminals for decryption. In this fashion, the ERS may be connected to multiple systems (and their CASs) for ECM retrofitting for each CAS. As noted, the amount of data being processed during ECM retrofitting is very small relative to having to encrypt the content itself for every CAS system. The problem arises, however, that the periodical key must be securely conveyed from each CAS to the ERS. The ERS may be a server, for example, remotely located from the CAS located at a cable head end. Frequently, the communication link may be insecure such that unauthorized access can be gained by pirates. Once the periodical key is accessed, the pre-encrypted content is decryptable.

The security problem also applies to the CPS. As noted, the CPS is for pre-encrypting the content offline to form pre-encrypted content. An OLES (off-line encryption) device is the mechanism for carrying out the pre-encryption. The OLES receives clear content, encrypts the content and generates an associated encryption record for each encryption session. Disadvantageously, the OLES is susceptible to being stolen by pirates. In fact, when compromised, the OLES is potentially useable for an indefinite period, at least until the compromise is detected by manual means. The outputs of the OLES are valuable and the lost revenue from a compromised OLES may be relatively high.

Therefore, there is a need to resolve the aforementioned problems relating to conveying cryptographic keys to the ERS and securing the OLES and the present invention meets this need.

SUMMARY OF THE INVENTION

Various aspects of the present invention are present in a system for securely delivering encrypted content on demand with access control. Unlike related art systems that employ real time encryption, the embodiments of the present system encrypt content offline (typically before the content is requested by the user) before it is distributed to point-to-point systems such as cable systems. The system allows content to be encrypted once, at a centralized facility, and to be useable at different point-to-point systems. The system periodically performs an operation called ECM retrofitting enabling the content to be useable in multiple systems and at multiple times in the same system.

Advantageously, the system allows keys (typically but not necessarily periodical) to be securely delivered from a CAS (conditional access system) to an ERS (encryption renewal system). EMMs (entitlement management messages) containing the periodical keys are employed. An EMM is generated by a CAS and is securely forwarded to the ERS using a fictitious address of a virtual set-top box.

Further, the system of the present invention denies access to pre-encrypted content generated by a compromised off-line encryption device (OLES). The system generates encrypted content and an associated encryption record having a time stamp, and allows the time stamp to be reported as a last authorized time stamp. When subsequent content from a compromised OLES is to be accessed, it is determined whether the time stamp associated with the subsequent content predates or is contemporaneous to the first time stamp. If the subsequent content carries an earlier or contemporaneous time stamp, the request is granted; otherwise, it is denied.

According to a first aspect of the present invention, a system for delivering content on demand to a subscriber terminal through a point-to-point communication network is disclosed. The system includes a content preparation module for pre-encrypting the content offline to form pre-encrypted content; an on-demand module receiving the pre-encrypted content from the content preparation module, and for forwarding the pre-encrypted content to the subscriber terminal when authorized; an encryption renewal system interfacing with the on-demand module to generate entitlement control messages allowing the pre-encrypted content to be decryptable for a designated duration; and a conditional access system for providing a periodical key to the encryption renewal system, to permit generation of the entitlement control message which conveys to the subscriber terminal information required to compute the periodical key in order to enable decryption of the pre-encrypted content.

According to another aspect of the present invention, a method for use in a communication system is disclosed. The method is for forwarding messages containing periodical keys from one or more access systems that control a population of set-top boxes to an encryption renewal system. The method includes storing a fictitious address of a virtual set-top box; generating a first message based on the fictitious address, the message containing a first periodical key; and forwarding the first message to the fictitious address of the virtual set-top box. In a further aspect, the method includes the encryption renewal system, which has knowledge of the fictitious address, receiving the first message.

According to another aspect of the present invention, the virtual set-top box appears to the first conditional access system as one of the population of set-top boxes within its control.

According to another aspect of the present invention, the method involves the steps of storing, by a second conditional access system, the fictitious address of the virtual set-top box; generating, by the second conditional access system, a second message having a second periodical key; and forwarding, by the second conditional access system, the second message to the fictitious address.

According to another aspect of the present invention is a conditional access system controlling a population of set-top boxes. The conditional access system includes one or more software instructions for storing a virtual set-top box address appearing as part of the population of set-top boxes; one or more software instructions for generating an entitlement management message having a cryptographic key for controlling the population of set-top boxes and the virtual set-top box; and one or more software instructions for forwarding the entitlement management message to the virtual set-top box address.

According to another aspect of the present invention, one embodiment discloses an encryption renewal system. The encryption renewal system features one or more software instructions for storing information relating to a virtual set-top address; one or more software instructions for receiving from a first conditional access system a first entitlement management message having a periodical key, the entitlement management message being intended for receipt by the virtual set-top address; and one or more software instructions for deriving the periodical key from the entitlement management message. Further, the encryption renewal system includes one or more software instructions for determining that the entitlement management message is from the first conditional access system.

According to another aspect of the present invention, the encryption renewal system further includes one or more software instructions for receiving from a second conditional access system a second entitlement management message having a periodical key, the entitlement management message being intended for receipt by the virtual set-top address; and one or more software instructions for deriving the periodical key from the entitlement management message.

According to another aspect of the present invention, the encryption renewal system further includes a database for storing the first periodical key of the first conditional access system, and a second periodical key associated with a second conditional access system.

According to another aspect of the present invention, the present invention is a conditional access system for controlling a population of set-top boxes. The conditional access system contains a means for storing a virtual set-top box address appearing as part of the population of set-top boxes; a means for generating an entitlement management message having a periodical key through which the conditional access system controls the population of set-top boxes; and a means for forwarding the entitlement management message to the virtual set-top box address, wherein said means may be software instructions, hardware or a combination of both.

According to another aspect of the present invention, the virtual set-top box address is unique to avoid collisions.

According to another aspect of the present invention, an encryption renewal system includes means for storing information relating to a virtual set-top address; means for receiving from a first conditional access system a first entitlement management message having a periodical key, the entitlement management message being intended for receipt by the virtual set-top address; and means for deriving the periodical key from the entitlement management message is disclosed. In another aspect, the encryption renewal system includes means for determining that the entitlement management message is from the first conditional access system.

According to another aspect of the present invention, a method is employed for controlling access to the pre-encrypted content in a network. The method includes encrypting clear content to form a first pre-encrypted content; generating a first encryption record having a first time stamp associated with the step of encrypting clear content; adding a cryptographic signature to the encryption record; reporting the first time stamp as a last permissible time stamp; receiving a request to provide access to a second pre-encrypted content, the request being accompanied by a second encryption record having a second time stamp; and determining whether the second encryption record has been altered.

If the second encryption record has been altered, the method includes denying the request to provide access the second pre-encrypted content; if no alteration to the second encryption record has occurred, determining whether the second time stamp predates or is contemporaneous to the first time stamp; if the second time stamp predates or is contemporaneous to the first time stamp, providing access to the second pre-encrypted content in accordance with the request; and if the second time stamp is subsequent to the first time stamp, denying the request to provide access to the second pre-encrypted content. The step of receiving is implemented by an encryption renewal system for retrofitting the pre-encrypted content with entitlement control messages.

According to another aspect of the present invention, is a system for denying access to second pre-encrypted content generated by a compromised off-line encryption device. The system comprises the off-line encryption device having one or more software instructions for encrypting content to form a first encrypted content and an associated first encryption record having a first time stamp; and an encryption renewal system having one or more software instructions for receiving a signal indicating the first time stamp as a last authorized time stamp, one or more software instructions for receiving a request to access the second pre-encrypted content, the request being accompanied by a second encryption record having a second time stamp; and one or more software instructions for determining whether the second time stamp predates or is contemporaneous to the first time stamp. If the second time stamp predates or is contemporaneous to the first time stamp, the request to access the second pre-encrypted content is granted, and if the second time stamp is subsequent to the first time stamp, the request to access the second pre-encrypted content is denied.

According to another aspect of the present invention, an encryption renewal system for controlling access to pre-encrypted content generated by an encryption device is disclosed. The system contains one or more software instructions for receiving a request to retrofit an entitlement control message that allows a home device to access pre-encrypted content; and one or more software instructions for retrofitting the entitlement control message only after verifying that the pre-encrypted content was generated prior to or contemporaneous with an authorized time stamp.

According to another aspect of the present invention, an encryption renewal system for controlling access to pre-encrypted content generated by an encryption device is disclosed. The system includes a means for receiving a request for an entitlement control message that allows a home device to access pre-encrypted content; a means for receiving a signal providing a first time stamp that was authorized; and a means for generating the entitlement control message only after verifying when the pre-encrypted content was generated.

According to another aspect of the present invention, is an offline encryption device including one or more software instructions for generating a first time stamp marking when a first encrypted content is generated; and one or more software instructions for generating a second time stamp marking when a second encrypted content is generated, such that if the first time stamp is the last authorized, the second encrypted content is decryptable only if the second time stamp is prior to or contemporaneous with the first time stamp.

According to another aspect of the present invention, the device includes one or more software instructions for determining whether the cryptographic signature has been altered.

According to another aspect, the device includes an encryption renewal system for receiving a signal providing that the first time stamp is the last authorized time stamp.

According to another aspect of the present invention, is an offline encryption device having a means for generating a first time stamp marking when a first encrypted content is generated; and a means for generating a second time stamp marking when a second encrypted content is generated, such that if the first time stamp is the last authorized, the second encrypted content is decryptable only if the second time stamp is prior to or contemporaneous with the first time stamp. The offline encryption device includes a means for generating an encryption record having the first time stamp.

The present invention incorporates all of the advantages of point-to-point services (i.e., video on demand) such as the inability of unauthorized persons to access content since there are no predefined schedules and VOD service is interactive and delivered to only a single subscriber. Advantageously, the present invention protects investments in OLES and their associated content by preventing access by unauthorized persons.

A further understanding of the nature and advantages of the invention herein may be realized by reference to the remaining portions of the specification and the attached drawings.

DETAILED DESCRIPTION OF THE INVENTION

A first embodiment of the present invention discloses a system for securely delivering encrypted content on demand with access control. The system encrypts the content prior to being distributed through a communication system such as a cable system, for example. Content is encrypted once at a centralized facility and is useable at different point-to-point systems and point-to-multipoint systems. Advantageously, the pre-encrypted contents in the present invention have indefinite lifetimes. The system periodically performs an operation called ECM retrofitting to keep pre-encrypted contents usable.

The system allows periodical keys to be securely delivered from a CAS (conditional access system) to an ERS (encryption renewal system). An EMM (entitlement management message) containing the periodical keys is employed. The EMM is generated by a CAS and is securely forwarded to the ERS using a fictitious address of a virtual set-top box. The EMM having a periodical key is then forwarded to the ERS using the fictitious address of the virtual set-top box.

Further yet, the system of the present invention can deny access to pre-encrypted content generated by a compromised off-line encryption device (OLES). The system generates encrypted content and an associated encryption record having a time stamp, and allows the time stamp to be reported as a last authorized time stamp. When subsequent content from a compromised OLES is to be accessed, it is determined whether the time stamp associated with the subsequent content predates or is contemporaneous to the first time stamp. If yes, the request is granted, otherwise, it is denied.

Figure 1:
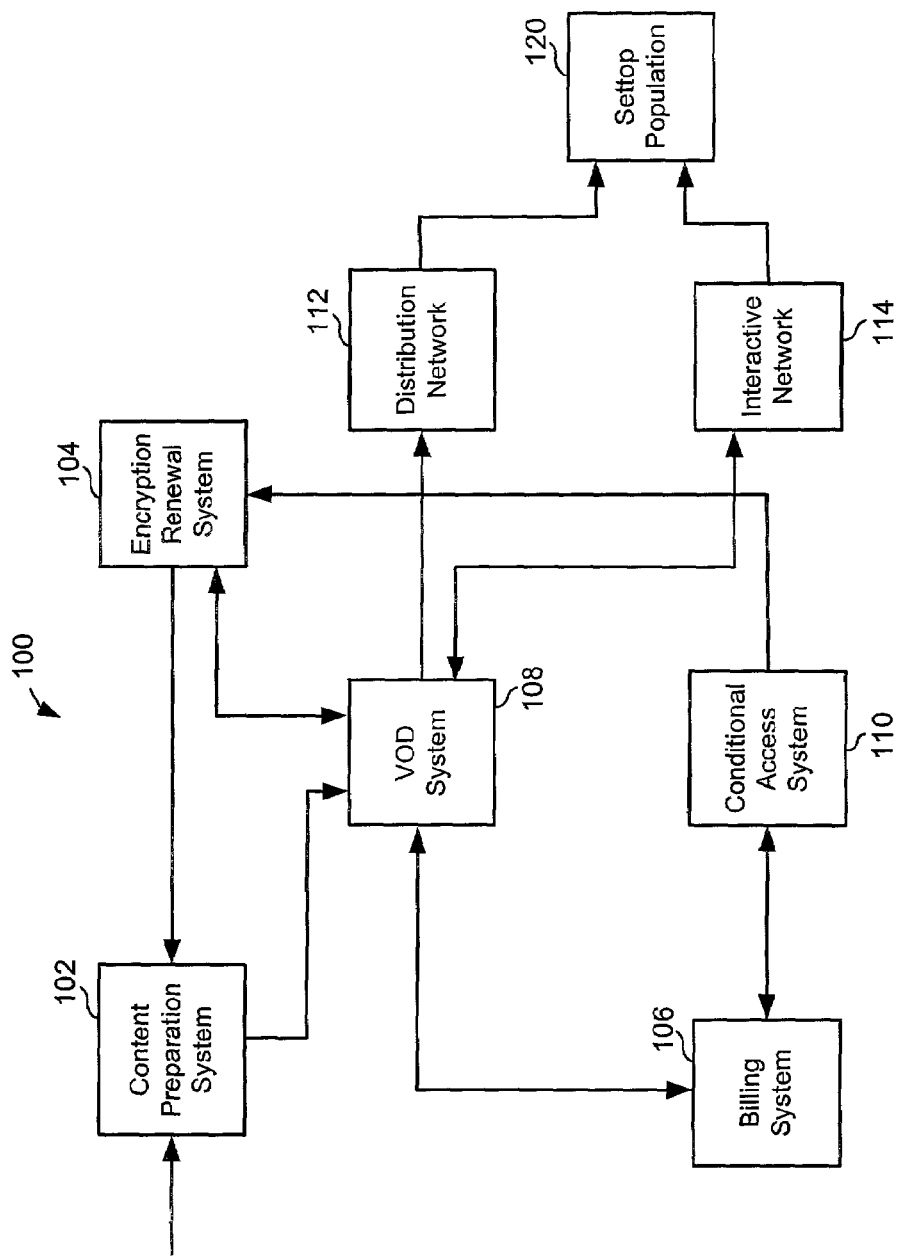
FIG. 1 shows a system architecture for delivering encrypted content to a subscriber in accordance with a first embodiment of the present invention.

FIG. 1 is a system architecture 100 for delivering encrypted content to a subscriber in accordance with a first embodiment of the present invention.

Among other components, system architecture 100 comprises a content preparation system (CPS) 102 for pre-encrypting content, video on demand (VOD) system 108 storing encrypted programs for distribution to subscribers on an on demand basis, conditional access system 110 for controlling one or more keys granting access to pre-encrypted content, an encryption renewal system 104 ERS accepting requests from the video on demand system to generate new entitlement control messages for pre-encrypted content, a distribution network 112 for distributing content, and an interactive network 114 providing two-way interaction between the subscriber and the content system. Although not shown, one of ordinary skill in the art would realize that other components and arrangement for achieving the various functionalities of system architecture 100 are possible. For example, VOD system may be coupled directly to CAS 110 and functionalities consolidated in both components since both components are typically located within a cable system head end.

In operation, the VOD system 108 is installed to provide VOD to subscribers. Before going live, VOD system 108 goes through a registration process with the ERS 104. This establishes the identity of the VOD system 108 to the ERS so it can produce proper and appropriate responses specific to that VOD system installation. Once the VOD system registration is complete, content may be added to the VOD system and made available to subscribers. Clear content (a), such as a movie, originates from a content provider and begins its entry to the VOD at CPS 102. Here, the clear content is encrypted using an Off Line Encryption System (OLES) (not shown), which pre-encrypts the content in preparation for delivery by VOD system 108. The OLES also generates an encryption record associated with the encrypted content. Note that the VOD system may keep the encryption record with the pre-encrypted content at all times as it identifies the content for later processing and decryption within VOD system 108.

Once the clear content is encrypted at the OLES, the resulting pre-encrypted content and associated encryption record are delivered to VOD system 108 for storage on the local server. Advantageously, multiple VOD systems may be coupled to CPS 102 such that content is encrypted once and distributed to the systems. VOD system 108 is responsible for keeping the pre-encrypted content and associated encryption record together. Before the pre-encrypted content may be requested or viewed by subscribers in their homes, VOD system 108 obtains suitable Entitlement Control Messages (ECMS) from the ERS 104. The VOD system submits an ECM request to ERS 104, containing the encryption record (c) for the desired pre-encrypted content.

ERS 104 responds with the proper ECMs, an ERS synchronization number, and a callback time. The ECMs are created specifically for the particular pre-encrypted content and particular point-to-point system within which the VOD system operates, and for a particular time period. The ECMs encrypt content using a key (typically periodical) provided by each conditional access system (CAS 110 in the present case) controlling the set-top boxes. VOD system (108) inserts the received ECMs into the streams along with the pre-encrypted content whenever it is spooled out to a subscriber. The ECMs are inserted into the streams with the content.

It should be observed that ECMs returned to VOD system 108 ERS 104 are valid and usable with the pre-encrypted content only for a limited time the exact time, determined by CAS 110, is not predictable in advance. Thus, the callback time returned with the ECMs indicates the time by which VOD system 108 should check with the ERS to see if ECMs for all pre-encrypted content may be updated. When the VOD system receives the callback time it should be stored and tracked against the current time. If the callback time is reached and the VOD system 108 has not contacted ERS 104 in the intervening time, then VOD system 108 attempts to contact the ERS 104 even if it has no new ECM requests to fulfill.

Content Preparation System (CPS)

In FIG. 1, content preparation system (CPS) 102 is a centralized facility for preparing contents according to the requirements of the VOD system (VOD) 108 and those of the Conditional Access system (CAS) 110. CPS 102 encodes content in a format (e.g., MPEG-2) suitable for storage on video servers and for distribution to the subscriber terminals. For content that is already available in the suitable format, this encoding step may be unnecessary. CPS 102 also functions to encrypt digitally encoded content according to the specifications of CAS 110.

The encryption process involves generating one or a series of cryptographic keys. As part of the encryption process, the cryptographic keys, or the parameters used in their generation, are saved in a data structure called an encryption record. The encryption record is protected by encryption to prevent unauthorized access to the keys. CPS 102 may package encrypted programs with the associated encryption records, which may additionally contain useful but nonessential information about the content. Such information may include program title, identification of the program assigned by different parties, encoding parameters, program length, etc. CPS 102 may serve multiple cable systems or multiple point-to-point systems.

Although not shown, CPS 102 includes an OLES (off line encryption) device for performing the aforementioned functionality. The OLES uses one or more non-real-time, or offline, encryption devices to encrypt content. A given OLES generates program-specific cryptographic keys that are used to encrypt content. The OLES is protected by physical security including physical access control and secure packaging. The OLES includes functions such as accepting encryption control provisioning parameters from the ERS including cryptographic information to support content encryption; selecting one or more cryptographic keys based on the encryption control parameters and system configuration which keys are used for encrypting the program content; generating an encryption record, which contains information about the keys used to encrypt the content. This record itself is encrypted to maintain the security of the encryption record; encrypting the program content using the chosen keys; and providing the encrypted content and the encryption record to the CPS, for subsequent transfer to at least one VODS.

Typically, an OLES is registered and authorized by the ERS 104 prior to having ability to perform encryption operations. ERS 104 provides a removable disk containing authorization and configuration parameters for the OLES such data being processed during initial setup. The OLES may use various encryption modes.

The OLES is capable of processing an MPEG content in an off-line manner whereby the raw content has been completely encoded and is obtainable from a server (VOD or other server) or has been placed onto the OLES system. One of ordinary skill will realize that the above guidelines are exemplary and other embodiments having different guidelines are possible.

Video On Demand System (VOD System

VOD system 108 comprises one or more video servers adapted for video on demand applications. The servers store encrypted programs for distribution to subscribers on an on demand basis. Thereafter, the pre-encrypted programs are routed and streamed to the authorized subscribers. In addition, VOD system 108 accepts purchase requests from subscriber terminals, and validates and authorizes such purchase requests as appropriate. In some instances, after a purchase request is approved, the VOD purchases may be temporarily stored until requested by the subscriber.

VOD systems generally are well known in the art and need not be described in detail. Thus, VOD system 108 may comprise off the shelf items including hardware and software and/or customizable software in accordance with one embodiment of the present invention.

Conditional Access System (CAS)

As noted, content system 100 includes a conditional access system (CAS) 110. CAS 110 permits access to pre-encrypted content by subscriber terminals by provisioning them with EMMs, and generating ECMs for non-VOD services. Other functions of CAS 110 include controlling real-time encryption devices in the cable system; reporting the (scheduled) occurrence of monthly key changes to the encryption renewal system (described below), and transmitting cable system-specific cryptographic parameters (e.g., monthly keys) to the encryption renewal system to enable ECM retrofitting. CAS 110 may be located either on site or off site, and may serve multiple cable systems, in which case CAS 110 acts as multiple logical conditional access systems. Furthermore, CAS 110 interfaces with the Billing System to obtain authorization information about each subscriber, and to report purchases to the Billing System. CAS systems are well known in the art and may comprise off the shelf items. In addition, one of ordinary skill in the art such as a programmer can develop code as may be necessary to accommodate the present invention.

Billing System (BS)

BS 106 interfaces with both VOD system 108 and CAS 110 to provide the following functions: (1) accepting subscription and service change requests from subscribers; (2) maintaining subscriber account information; (3) billing subscribers; (4) interfacing with VOD system 108 to provide the latter with subscriber authorization status, and to collect video on demand purchase information from the latter; and (5) providing subscriber authorization status, service and event definition information, and to collecting purchase information.

Encryption Renewal System (ERS)

As shown in FIG. 1, ERS 104 interfaces with CPS 102, VOD system 108 and CAS 110. ERS 104 enables pre-encrypted content to be distributed to VOS system 108 and other authorized VOD system entities while enabling access control within each CAS 110. The ERS performs ECM renewal (ECM retrofitting) in synchronization with category epoch rollover events occurring within each participating CAS 110. A category epoch is the nominal period during which a periodical key used by CAS 110 to protect the distribution of ECM keys is in effect.

Encrypted content from the CPS is unusable until an initial ECM "renewal" operation is performed. To make the content usable for the first time, VOD system 108 contacts ERS 104 to obtain the first set of ECMs. Henceforth, ECM renewal is performed periodically to keep valid ECMs associated with each content title on the VOD system. ERS 104 functions include: generating encryption control parameters for initializing OLES devices, communicating with the CAS in different point to point systems, accepting requests from a VOD system to generate ECMs for pre-encrypted content, computing retrofitted ECMs, sending retrofitted ECMs to the requesting VODS, and maintaining databases of appropriate parameters. ERS 104 may also interface with VOD system 108 to forward information about (scheduled) monthly key changes to VOD system 108.

ERS 104 is implementable using hardware, software or a combination of both. For example, a number of platforms such as Sun/SolarisTM and coding language such as Java™ or servers like Apache Group's Apache™, Microsoft's IIS™, and operating environments such as Windows NT™, NetBSD™ may be employed in the present invention.

Distribution Network

Distribution Network 112 is a network that distributes signals to all or a subset of the subscribers in the system. Distribution Network 112 may comprise hybrid fiber-coax (HFC) technology, for example. In an HFC network, for example, broadcast signals are distributed from the head end (central office) to a number of second level facilities (distribution hubs). Each hub in turn distributes carriers to a number of fiber nodes. In a typical arrangement, the distribution medium from the head-end down to the fiber node level is optical fibers. Subscriber homes are connected to fiber hubs via coaxial cables. At some level of distribution facility (hub, fiber node, or other distribution facilities), video on demand carriers are broadcast to a subset of the subscriber terminal population served by the distribution facility. This typically occurs at the fiber node level. This arrangement allows the reuse of video on demand carrier frequencies, say across fiber nodes, because different fiber nodes broadcast different video on demand carriers to the subscribers they serve.

Interactive Network

Interactive network 114 is communicably coupled to VOD system 108 and set top population 120 to provide a two-way communication capability between the subscriber terminals and the VOD system 108. Interactive Network 114 may share some of the physical infrastructure of Distribution Network 112.

Renewing ECMs

ECM retrofitting is the process of generating ECMs for pre-encrypted contents so that they are useable in different cable systems and despite monthly key changes. It is performed by a server hosted in ERS 104, which is a secure environment. Content is encrypted prior to a request from a subscriber terminal. ERS 104 provisions the offline encryption devices in CPS 102 with encryption control parameters, which, among other functions, enable ERS 104 to retrieve information from encryption records generated by the CPS. This provisioning need be done only infrequently, or possibly just once. It need not be done with every ECM retrofitting request from the VOD system 108.

Next, an encryption record of parameters for encrypting the content is generated. VOD system 108 establishes a secured connection to ERS 104. To make a pre-encrypted program usable in a particular system for a particular period, VOD system 108 sends the encryption record to ERS 104 which checks the authorization status of the requested content from VOD system 108. If the authorization check fails, ERS 104 terminates the session. Otherwise, the process continues. ERS 104 generates one or more ECMs for the pre-encrypted program using the periodical cryptographic key associated with the cable system (and possibly other parameters required by the CAS). The ECM(s) are created in such a way that they will be valid until the periodical cryptographic key of the target system changes again. ERS 104 sends the retrofitted ECM(s) and pre-encrypted content to the subscriber via VOD system 108.

Figure 2:
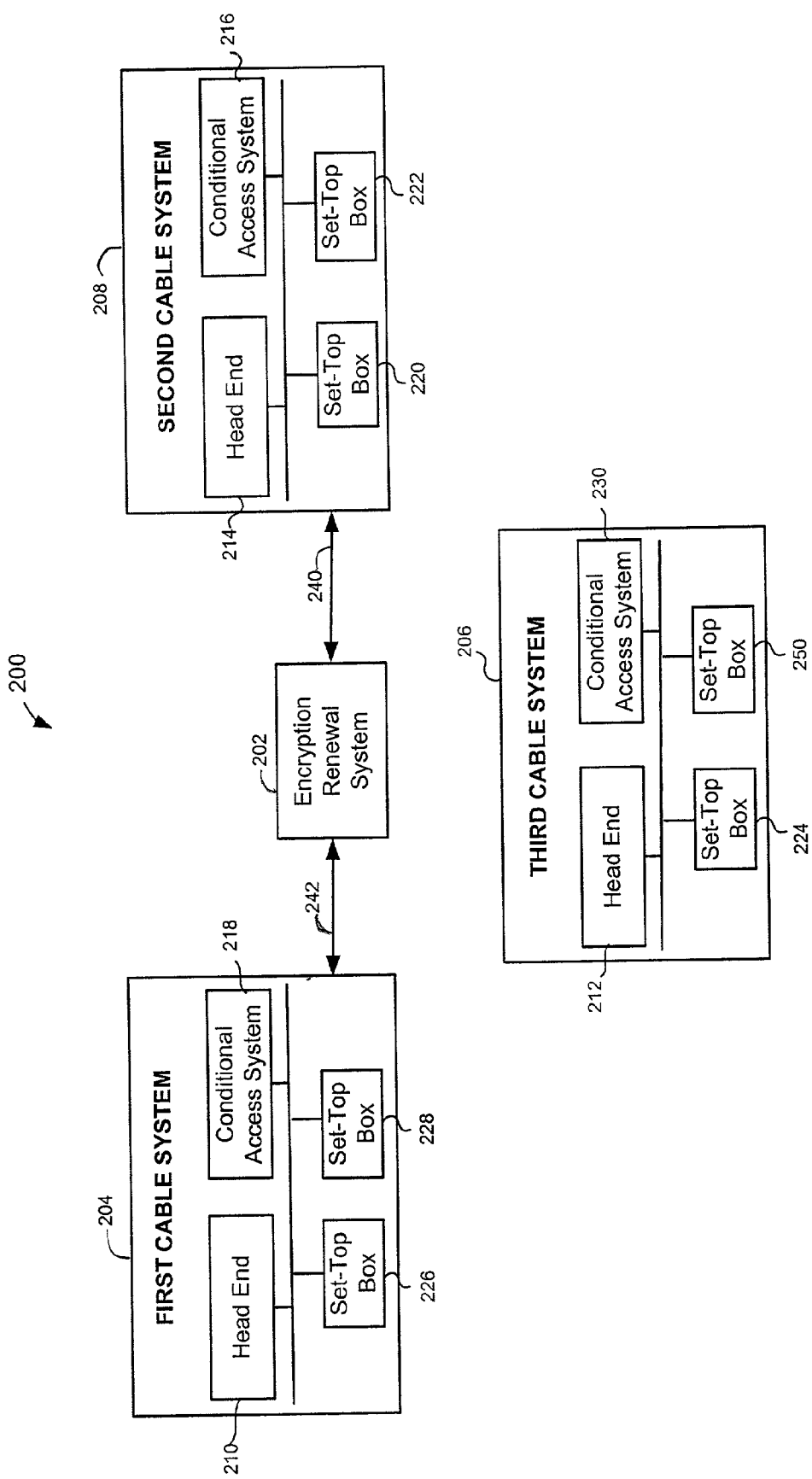
FIG. 2 is a block diagram of a communication network for conveying periodical keys to a single ERS.

FIG. 2 is a block diagram of a communication network 200 for conveying periodical keys to a single ERS 202. Among other components, communication network 200 comprises ERS 202 for receiving the periodical keys from one or more point-to-point systems 204, 206, 208; a database (not shown) for storing the periodical keys; and entitlement management messages (EMM) (not shown) for conveying the periodical keys to ERS 202. Point-to-point system or first cable system 204 contains a conditional access system (CAS) 218 for controlling a population of set-top boxes 226, 228 and a VOD server system (not shown). Conventionally, CAS 218 controls the population of set-top boxes by forwarding EMMs (entitlement management messages) having the periodical keys to each set-top box.

Advantageously, the present invention exploits this feature by having CAS 218 forward the periodical keys to ERS 202 using EMMs. ERS 202 uses the keys to generate the ECMs that are returned to the point-to-point systems with the pre-encrypted content. Therefore, as will be recognized by one of ordinary skill in the art, conventional CASs require less modification to accommodate the present invention because the CASs have the know-how to generate EMMs. It should be noted that each EMM is generated for a specific set-top box. Within each set-top box is the unit key (seed) (not shown) included at time of manufacture and each CAS knows the unit key for each set-top box within its domain. The EMM generated carries the periodical key and other information all of which are encrypted using the unit key. In addition, as shown in FIG. 2, cable system 206 includes a CAS 230, set-top boxes 224, 250 a VOD system (not shown). A CAS 216, set-top boxes 220, 222 and a VOD system (not shown) are located within point-to-point system 208.

In operation, in order to generate the ECMs, the EMMs having periodical keys must be forwarded to ERS 202 in a secure fashion as will be discussed with reference to FIG. 3.

Figure 3:
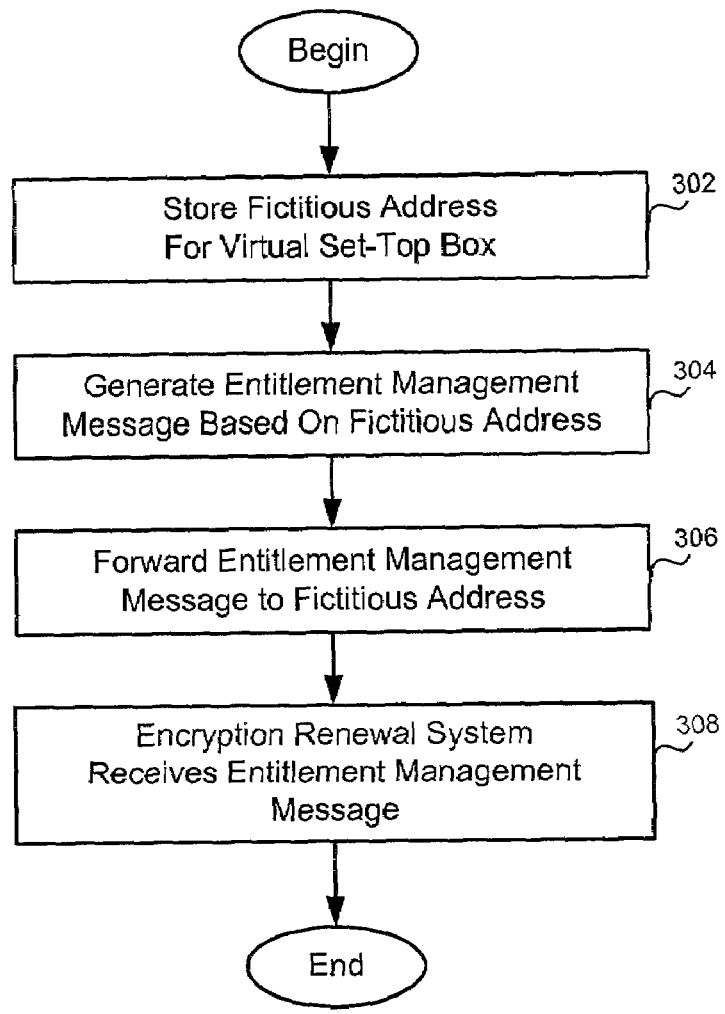
FIG. 3 is a flow diagram for forwarding EMMs containing periodical keys from the CAS to the ERS.

FIG. 3 is a flow diagram for forwarding EMMs containing periodical keys from CAS 216 to ERS 202 (FIG. 2). Although, not shown, the method of the present invention is also applicable to transfer of EMMs from CAS 218 and CAS 230 to ERS 202.

At block 302, the method involves storing a fictitious address of a virtual set-top box. That is, a fictitious address is defined for a non-existent set-top box. CAS 216 is informed of the virtual set-top box No. 1234, for example. Thereafter, ERS 202 needs to track only the unit key applicable to set-top box 1234 and not those for every set-top box in its population. The fictitious address is used by all of the CASs to address ERS 202 which appears as a set-top box to all of the CAS systems. Each CAS system is deceived into considering the fictitious address as part of their set-top box population. The methodology of defining a single virtual set-top box is particularly advantageous because simplicity is maintained. If each of the CASs were to forward a random EMM, ERS 202 may become overly complex in terms of the required hardware and software. Similarly, complexity is avoided by not choosing at random a set-top box to convey the EMM. Otherwise, ERS 202 would have to track too many set-top boxes to receive the EMM. Moreover, by preassigning the virtual set-top box, the possibility of colliding with a real set-top box address is avoided.

At block 304, the method involves generating an EMM based on the fictitious address, the EMM containing the periodical key for cable system 208.

At block 306, the step of forwarding the EMM to the fictitious address of the virtual set-top box is illustrated. As noted, the fictitious address appears to be within the CAS 216 set-top box population.

At block 308, the method includes the step of receiving the EMM by ERS 202 which has information concerning the fictitious address. ERS 202 contains secure code and acts like a set-top to derive the clear periodical key from the EMM. The periodical key is typically buried inside the EMM. ERS 202 also contains database (not shown) which stores the periodical key associated with each CAS. In this fashion, upon receiving an EMM, ERS 202 retrofits the requisite ECM having the periodical key for forwarding to the appropriate cable system. Although not shown, one of ordinary skill in the art will realize that communication links 242, 240 may comprise wired telephone line, fiber, satellite or radio frequency channel for example. In fact, no physical link may exist e.g. SneakerNet wherein the EMM is manually collected on a floppy disk and walked over to ERS 202. The so-called SneakerNet provides the advantage of erecting a physical barrier between the components.

Figure 4:
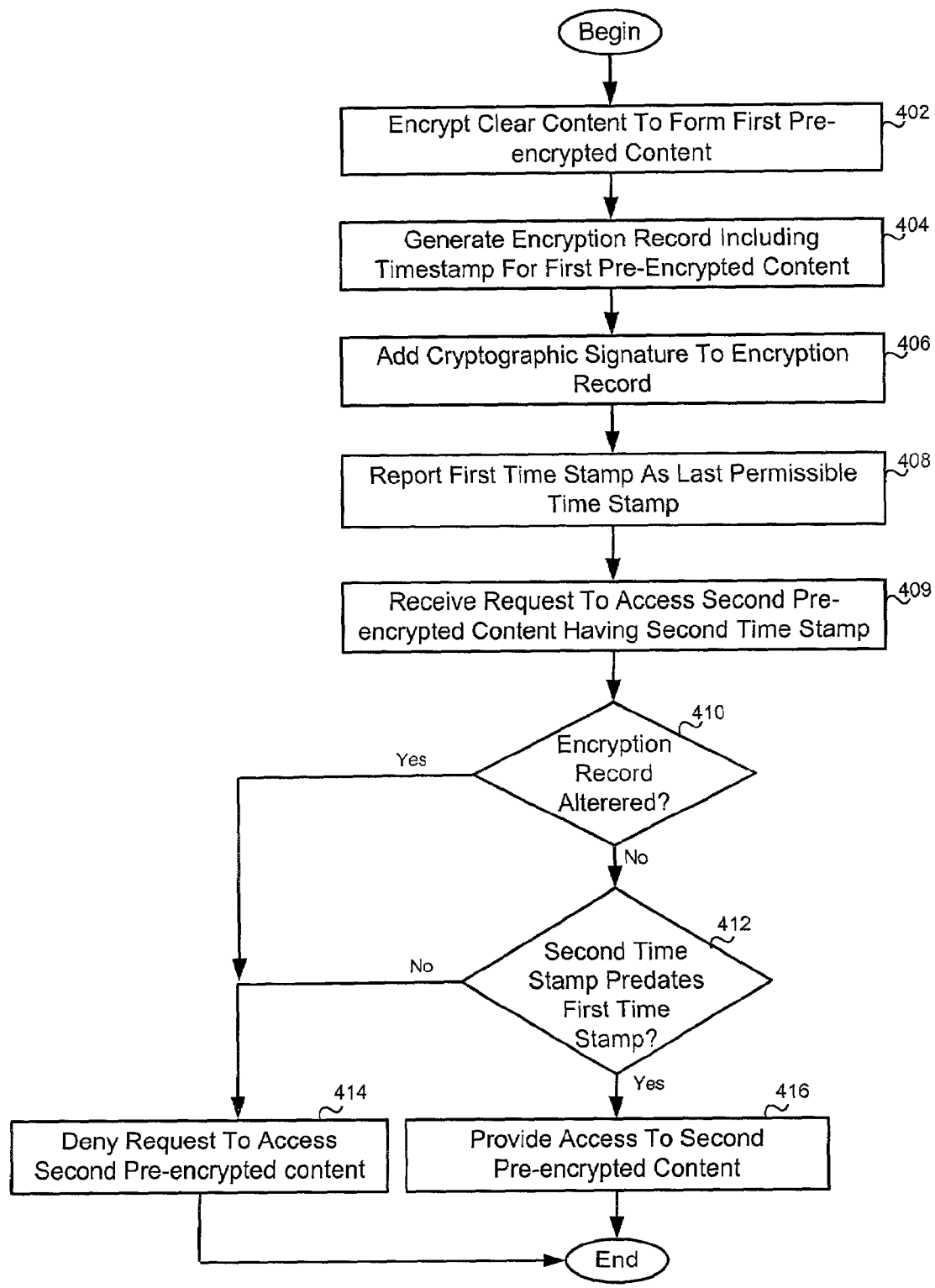
FIG. 4 is an exemplary flow diagram of the steps for controlling access to pre-encrypted content in accordance with a first embodiment of the present invention.

FIG. 4 is an exemplary flow diagram of the steps for controlling access to pre-encrypted content in accordance with a first embodiment of the present invention. The present method ensures that the pre-encrypted content generated by a compromised OLES is inaccessible to subscribers.

Referring to FIGS. 1 and 4, at block 402, the method involves encrypting clear content to form a first pre-encrypted content during an encryption session. The encryption is performed at CPS 102 which has one or more offline encryption systems (OLES) to perform the actual encryption. The OLES generates the program-specific cryptographic key(s) used to encrypt content, and is protected by physical security (physical access control or secure packaging). The encryption part of the content preparation process consists of the following steps: (1) ERS 104 provides the OLES with encryption control parameters. Such parameters may be used, for example, for the protection of encryption records by means of encryption; (2) and the offline encryption devices select one or more cryptographic keys (depending on configuration) which are used to encrypt the content.

At block 404, the method comprises generating a first encryption record having a first time stamp associated with the step of encrypting clear content. The time stamp marks when the OLES encryption session took place. Each OLES session is time stamped so that when the OLES is compromised, the legal owner can trace the last legal OLES session. The timestamp may be provided using a personal computer (PC) clock, for example. However, this alternative remains vulnerable because a pirate who compromised the OLES can easily reset the PC clock. Advantageously, the present invention employs secure software embedded in hardware within the OLES to generate the time stamp. In one embodiment, the time stamp is an ascending number generated by the secure software. The OLES generates the encryption record containing information about the keys used to encrypt the program. The OLES encrypts the clear content using the chosen key(s) and the pre-encrypted content is recorded and packaged together with the encryption record. Table I below is an exemplary embodiment of an encryption record having a time stamp in accordance with a first embodiment of the present invention. The "Encrypted Data Block" element contains the time stamp.

| Element Name | Element Value | Generating Device |
| --- | --- | --- |
| TitleIdCode | String | OLES SW. |
| ContentTitle | String | OLES SW |
| EncryptionTime | Time | OLES SW |
| OLESId | Long | OLES Security Dev. |
| TimeStamp | Integer | OLES Security Dev. |
| EncryptionMode | Integer | OLES Security Dev. |
| EncryptedDataVersion | Integer | OLES Security Dev. |
| EncryptedDataBlock | (Key Size) | OLES Security Dev. |

At block 406, the step of adding a cryptographic signature to the encryption record is illustrated. The cryptographic signature may be produced by encrypting the checksum or hash of the encryption record, for example. The cryptographic strong signature is added to the encryption record to provide additional security. This signature covers every secured field in the encryption record including the time stamp.

At block 408, the first time stamp is reported as the last permissible time stamp. The owner has discovered that the OLES has been compromised, and thereafter forwards a report to ERS 104, the report providing the last authorized time stamp when content was last encrypted when the OLES was in possession of the owner. The owner of the OLES is asked to track all encryption records generated by a successful session. The encryption records are needed when new ECMs are requested. Hence, this procedure is a regular one and provides no additional burden to the OLES owner. Should the legal owner discover that an OLES has been compromised, the owner must report the breach to ERS 104. ERS 104 allows an owner to "report a compromised OLES". In this report, the last legal time stamp is one of the fields conveyed to ERS 104.

At block 409, a request to retrofit a second pre-encrypted content generated by a compromised OLES is received from VOD system 108. The request is for an ECM having the appropriate key information to allow subscriber access to the second pre-encrypted content. When received, the request is accompanied by a second encryption record having a second time stamp associated with the second pre-encrypted content.

At decision block 410, the method involves determining by ERS 104 whether the second encryption record has been altered. This step is accomplished by verifying the digital signature.

At block 414, if the second encryption record has been altered or the signature is incorrect, ERS 104 denies the request to provide access to the second pre-encrypted content.

At decision block 412, on the other hand, if no alteration to the encryption record has occurred, the method determines whether the second time stamp predates or is contemporaneous to the first time stamp.

At block 416, if the second time stamp predates or is contemporaneous to the first time stamp, access to the second pre-encrypted content in accordance with the request is provided by generating and forwarding the requested ECM to VOD system 108. That is, ERS 104 determines that the second time stamp is earlier than the last legal time stamp, indicating the second pre-encrypted content was generated while in possession of the owner.

At block 414, if the second time stamp is subsequent to the first time stamp, the request to provide access to the pre-encrypted content is denied, and no ECM is generated by ERS 104. In this manner, the present method ensures that the pre-encrypted content generated by a compromised OLES is inaccessible to subscribers, and theft of the OLES is discouraged.

Synchronizing ECM Retrofitting with Periodical Key Changes

Since ECMs are cryptographically protected by a periodical key, their lifetimes are limited by the expiration of the periodical key (although their lifetimes could be limited by other factors). As the periodical key of a cable system changes, new ECMs need to be retrofitted to pre-encrypted programs. The retrofitting of ECMs therefore needs to be synchronized with the periodical key renewal process.

After a new periodical key has been generated and before the expiration of the current periodical key, CAS 110 communicates the new periodical key and its validity period to ERS 104 over a secured communication channel. This communication takes place at least $t_1$ minutes before the expiration of the current periodical key. VOD system 108 communicates periodically with ERS 104 to perform ECM retrofitting on newly introduced and/or existing pre-encrypted programs, to check for scheduled occurrence of periodical key changes, or both. VOD system 108 communicates with ERS 104 to perform the above function no less often than every $t_1$ minutes. Alternatively, ERS 104 may maintain a list of VOD system (and the addressing information) and forward scheduled occurrences of monthly changes to the affected VOD system. While the above is a complete description of exemplary specific embodiments of the invention, additional embodiments are also possible. Thus, the above description should not be taken as limiting the scope of the invention, which is defined by the appended claims along with their full scope of equivalents.

What is claimed is:

1. A method for use in cable systems, the method for forwarding messages containing cryptographic keys from multiple conditional access systems that control a population of set-top boxes to an encryption renewal system, the method comprising:
    defining a fictitious address for a single virtual set-top box, wherein said fictitious address is used by said multiple conditional access systems to address said encryption renewal system;
    storing said fictitious address at each of said multiple conditional access systems;
    generating a unique key within each of said multiple conditional access systems as a function of the identity of each particular multiple conditional access system;
    encrypting said unique key for each of said multiple conditional access systems;
    encapsulating each of said encrypted unique keys in an encoded message; and
    forwarding the encoded message to said fictitious address.

2. The method of claim 1 further comprising receiving the encoded message by the encryption renewal system which has information regarding the fictitious address.

3. The method of claim 1 further comprising deriving by the encryption renewal system the unique key from the encoded message.

4. The method of claim 1 further comprising forwarding to a subscriber set-top box, a control message containing information having the unique key for allowing the set-top box to decrypt pre-encrypted content for a designated duration.

* * * * *